(12) United States Patent
Trachtenberg

(10) Patent No.: US 6,446,453 B1
(45) Date of Patent: Sep. 10, 2002

(54) UNITARY HOSE CONNECTOR FOR AUTOMOBILE AIR CONDITIONER SERVICING AND KIT UTILIZING SAME

(75) Inventor: Saul Trachtenberg, Brooklyn, NY (US)

(73) Assignee: Interdynamics, Inc., Brooklyn, NY (US)

( * ) Notice: Subject to any disclaimer, the term of this patent is extended or adjusted under 35 U.S.C. 154(b) by 0 days.

(21) Appl. No.: 09/689,088

(22) Filed: Oct. 12, 2000

(51) Int. Cl.[7] ................................. F25B 45/00
(52) U.S. Cl. ............................ 62/292; 62/77
(58) Field of Search .................... 62/292, 77

(56) References Cited

U.S. PATENT DOCUMENTS

| | | | | |
|---|---|---|---|---|
| 5,540,254 A | * | 7/1996 | McGowan et al. | 137/315 |
| 5,544,494 A | * | 8/1996 | Manz et al. | 62/292 |
| 5,557,940 A | * | 9/1996 | Hendricks | 62/149 |
| 5,827,050 A | * | 10/1998 | Price | 417/207 |
| 5,875,638 A | * | 3/1999 | Tinsler | 62/149 |
| 6,089,032 A | | 7/2000 | Trachtenberg | |
| 6,119,475 A | * | 9/2000 | Murray et al. | 62/292 |
| 6,158,229 A | * | 12/2000 | Aizawa | 62/77 |
| 6,158,234 A | * | 12/2000 | Szutu | 62/292 |
| 6,164,348 A | * | 12/2000 | Rodwell et al. | 141/382 |
| 6,216,473 B1 | * | 4/2001 | Arii | 62/77 |

* cited by examiner

*Primary Examiner*—William C. Doerrler
*Assistant Examiner*—Mark Shulman
(74) *Attorney, Agent, or Firm*—Levisohn, Lerner, Berger & Langsam

(57) ABSTRACT

A unitary hose connection for servicing an automobile air conditioning system is provided. A first connector is disposed at one first end and is connectable with a low pressure service port of an automobile air conditioning system. A second connector is disposed at the other end of the hose and is selectively connectable with both a pressure gauge and a can tap valve. The can tap valve is attachable to a can of compressed refrigerant. When a pressure gauge is attached to the second connector and the first connector is attached to the service port, the pressure of the refrigerant in the automobile air conditioning system can be measured. When the second connector is attached to the can tap valve, the compressed refrigerant in the can may be introduced into the automobile air conditioning system to thereby service the system. The hose connection, pressure gauge, can tap valve, and can of refrigerant may be packaged together in a kit.

8 Claims, 1 Drawing Sheet

UNITARY HOSE CONNECTOR FOR AUTOMOBILE AIR CONDITIONER SERVICING AND KIT UTILIZING SAME

BACKGROUND OF THE INVENTION

1. Field of the Invention

The invention relates to devices that facilitate the servicing and recharging of automobile air conditioning systems by the consumer.

2. Description of Related Art

There are many automobile owners who like to handle their own automotive maintenance in a "do-it-yourself" manner. Instead of taking their automobiles to a mechanic every time it needs servicing, the do-it-yourselfer likes to take proactive responsibility for the simple maintenance of his vehicle. Often, this type of work includes changing fluids, including the refrigerant in the automobile air conditioning system.

The changing and servicing of air conditioning refrigerant can pose certain mechanical challenges. For one, it can be difficult to determine how much refrigerant is present in the system; the refrigerant is gaseous, so a dipstick is not a viable option. A pressure gauge might be connected to the low pressure service port of an automobile air conditioner, however the low pressure service port has a special connection that fits few commercially available pressure gauges. If the pressure is determined to be low, the home mechanic must add additional refrigerant to the system. Again, accessing the low pressure service port can be difficult. Typically, the refrigerant is available in 8–12 ounce canisters such as described in U.S. Pat. No. 6,089,032 to Trachtenberg (incorporated herein by reference), the same Trachtenberg as the present inventor, and which is assigned to the same assignee as is the present invention.

SUMMARY OF THE INVENTION

Accordingly, it is an object of the invention to provide a system for easily selectively attaching both a pressure gauge and a canister of refrigerant to an automobile air conditioner.

It is another object of the invention to provide a connector which allows a typical home mechanic to service the air conditioner in his automobile quickly and easily.

It is another object of the invention to provide a kit which allows a typical home mechanic to service the air conditioner in his automobile quickly and easily by way of checking the refrigerant pressure in the system and adding additional refrigerant to the system.

The above and other objects are fulfilled by the invention, which is a unitary hose connection for servicing an automobile air conditioning system. The hose connection has a first end and a second end. A first connector is provided at the first end and connectable with a low pressure service port of an automobile air conditioning system. A second connector is provided at the second end of the hose selectively connectable with both a pressure gauge and a can tap valve; the can tap valve is generally attached to a can of compressed refrigerant, preferably R-134a. The hose is preferably less than or equal to 11½ inches in length so as to be available by law to home users.

The invention also includes a kit for servicing an automobile air conditioning system. The kit is provided with a pressure gauge having a gauge connection port, and a can tap valve fittable on and communicable with a can of compressed refrigerant having a valve connection port. The kit also includes a hose having a first end and a second end. A first connector is provided at the first end and is connectable with a low pressure service port of an automobile air conditioning system. A second connector is disposed at the second end of the hose and is selectively connectable with both the gauge connection port and the valve connection port. Preferably, the gauge connection port is provided with first threads at a predetermined thread pitch, the valve connection port is provided with second threads at the predetermined thread pitch, and the second connector is provided with third threads at the same predetermined thread pitch as the pressure gauge and the can tap valve.

DETAILED DESCRIPTION OF THE PREFERRED EMBODIMENTS

Description of the invention will now be given with reference to the attached drawings, which are illustrative and exemplary in nature only. The drawings are not meant to limit the scope of the invention in any way, said scope being defined by the claims appearing below.

Figure 1:
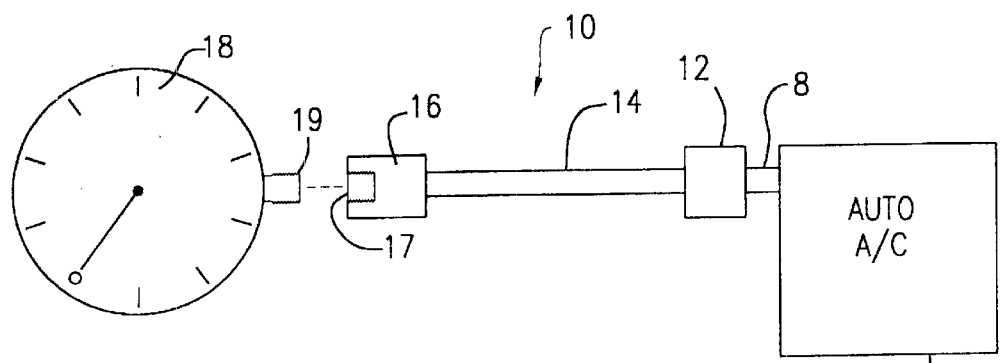
FIG. 1 is a schematic of the inventive hose connector being attached to a pressure gauge.
Figure 2:
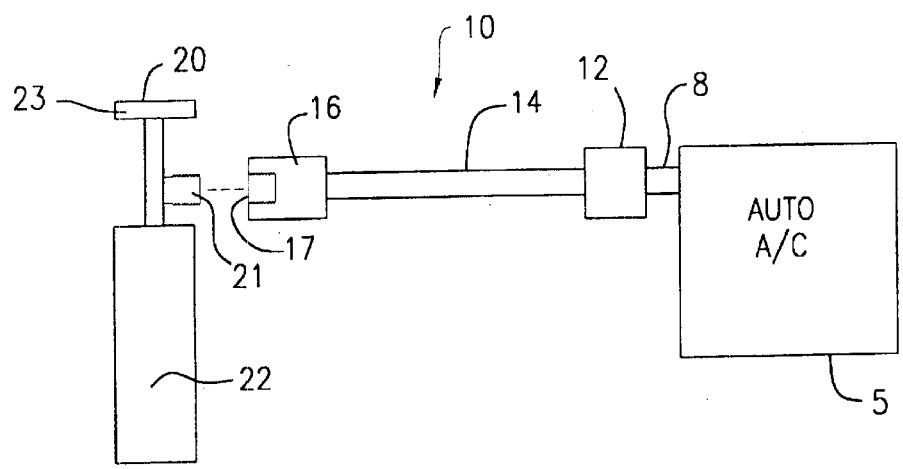
FIG. 2 is a schematic of the inventive hose connector being attached to a can tap valve.

The typical automobile air conditioning system is shown schematically in FIGS. 1 and 2 as block 5. The air conditioner usually has a high pressure side and a low pressure side. The low pressure side is the side which is more commonly accessed to service the air conditioner. The low pressure side is provided with a low pressure service port 8 which generally has a male quick-connect attachment at its distal end. The female part of this connection is similar to that provided for common garden hoses, i.e., it includes a spring-biased bushing which, when retracted, enables bearings to retract to allow the female connector to be placed onto a mating male attachment. When the female connector is placed on the male attachment, the user releases the bushing and the two pieces engage. Typically, the automobile air conditioner is provided with the male attachment portion of the quick-connect.

The invention lies primarily in the unitary hose connection 10 shown in FIGS. 1 and 2. At one end of hose 14 is disposed the female portion 12 of the quick-connect used on the automobile air conditioner low pressure service port. On the other end, connector 16 is provided with threads 17 at a predetermined thread pitch. Connection 10 is adapted to be connected to the air conditioner service port 8 at one end and a pressure gauge 18 and a can tap valve 20 at the other end. The thread pitch of threads 17 are selected to allow threads 19 of pressure gauge 18 to matingly engage with connector 16 in a substantially airtight manner. The can tap valve 20 is also provided with threads 21 which have the same thread pitch as both the pressure gauge threads 19 and threads 17 of connector 16. In this way, either can be connected to connector 16.

Can tap valve 20 is typically provided with a puncturing mechanism (not shown) for puncturing the seal on can 22. Can 22 preferably contains auto air conditioning refrigerant, such as R-134a, for example, under pressure. Can tap valve 20 is attached to can 22, and threads 21 are attached to connector 16 when it is desired to add refrigerant to the air conditioner 5. To open the can tap valve 20, handle 23 is turned. This causes the puncture point to be lowered into the seal of the can.

In operation, the invention works as follows. The home mechanic determines that he would like to service his automobile air conditioner. First, gauge 18 is fitted into connector 16. In the preferred embodiment shown in the figures, male threads 19 on the pressure gauge engage female threads 17 of connector 16. Female connector 12 of hose 10 is then secured to the male low pressure service port 8 of the air conditioner 5. When the connection is secure, the pressure of the refrigerant in the system will be measured on gauge 18. The home mechanic can determine how much refrigerant needs to be added to the system.

The user next detaches connector 12 from service port 8. In this way, only the small amount of refrigerant remaining in the hose will vent to the atmosphere. With hose 10 detached from air conditioner 5, the user attaches can tap valve 20 to connector 16. Again, in the preferred embodiment, male threads 21 of can tap valve 20 engage female threads 17 of connector 16. The can tap valve is attached to a can 22 of refrigerant, but the valve is not yet opened; connector 12 is reattached to service port 8 of the air conditioner. With the system securely connected, handle 23 is turned to move the puncture point of can tap valve 20 downward to break the seal of can 22. When the handle is turned in the opposite direction, the puncture point retracts, and the compressed refrigerant in the can exits the can, passes through the valve and the hose, and enters the air conditioner.

One of the benefits of the invention lies in the reduction of materials, specifically hose. Traditionally, one hose was used to connect the pressure gauge to the air conditioner for pressure measuring, and another hose was needed to connect the can tap valve (and thus the can of refrigerant) to the air conditioner for refilling. With the instant invention, because both the pressure gauge and the can tap valve are attachable to the same connector on the same hose, only a single length of hose is necessary, thereby saving materials.

The invention is not only contemplated as being the hose connection 10 but also a whole kit that provides the user with everything needed to service the air conditioner. The contemplated kit includes the unitary hose connection 10, pressure gauge 18, can tap valve 20, and one or more cans of refrigerant 22 all packaged together.

The invention is not limited to the above description but rather is defined by the claims appearing hereinbelow. Modifications to the above description that include that which is known in the art are well within the scope of the contemplated invention. For example, the manner in which the hose connects to the pressure gauge and the can tap valve is described in the preferred embodiment as a threaded connection. However, other known forms of connection may be employed, so long as both the pressure gauge and the can tap valve may be selectively connected to the hose. For example, the same type of quick-connect connector employed as connector 12 may be employed to connect the pressure gauge and the can tap valve to the hose. As another alternative, the pressure gauge and can tap valve may be provided with the female threads and the hose may be provided with the corresponding male threads. Any other forms of known substantially airtight connections may be used.

What is claimed is:

1. A kit for servicing an automobile air conditioning system, comprising:

a pressure gauge having a gauge connection port;

a can tap valve fittable on and communicable with a can of compressed refrigerant, said can tap valve having a valve connection port;

a hose having a first end and a second end;

a first connector disposed at said first end and connectable with a low pressure service port of an automobile air conditioning system; and a second connector disposed at said second end of said hose selectively connectable with both said gauge connection port and said valve connection port.

2. A kit according to claim 1, wherein when said pressure gauge is attached to said second connector and said first connector is attached to the service port, the pressure of the refrigerant in the automobile air conditioning system can be measured, and when said second connector is attached to said can tap valve, said compressed refrigerant in said can may be introduced into the automobile air conditioning system to thereby service the system.

3. A kit according to claim 1, said second connector having threads at a predetermined thread pitch substantially identical to corresponding thread pitches provided on said can tap valve and said pressure gauge, said can tap valve and said pressure gauge having substantially identical thread pitches.

4. A kit according to claim 1, wherein said hose is 11½ inches long.

5. A kit according to claim 1, wherein said gauge connection port is provided with first threads at a predetermined thread pitch, said valve connection port is provided with second threads at said predetermined thread pitch, and said second connector is provided with third threads at said predetermined thread pitch.

6. A kit for servicing an automobile air conditioning system, comprising:

a pressure gauge having a threaded connection of a predetermined thread pitch;

a can tap valve fittable on and communicable with a can of compressed refrigerant, said can tap valve having a threaded connection of a predetermined thread pitch substantially identical to said predetermined thread pitch of said pressure gauge;

a hose having a first end and a second end;

a first connector disposed at said first end and connectable with a low pressure service port of an automobile air conditioning system; and a second connector disposed at said second end of said hose selectively connectable with both said pressure gauge and said can tap valve, said second connector having threads provided at said predetermined thread pitch.

7. A kit according to claim 6, further comprising a can of compressed refrigerant to which said can tap valve may be connected.

8. A kit according to claim 6, wherein said refrigerant is R-134a.

* * * * *